United States Patent Office 3,400,778
Patented Sept. 10, 1968

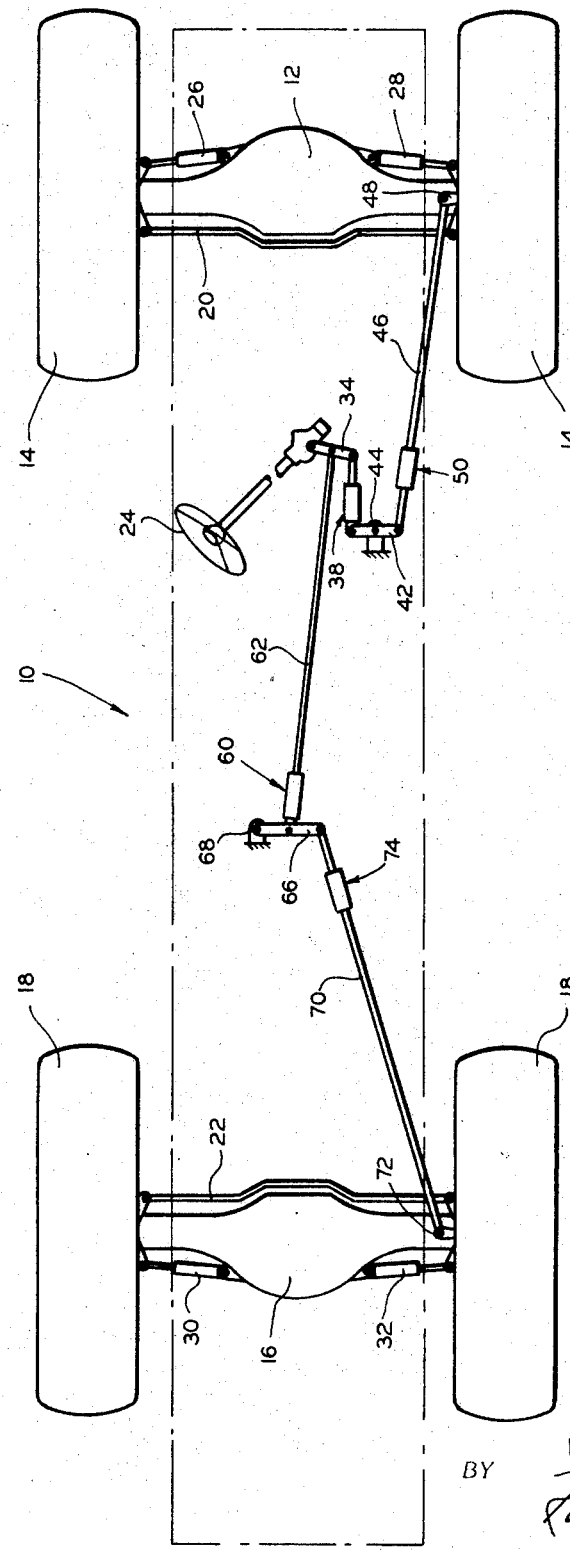

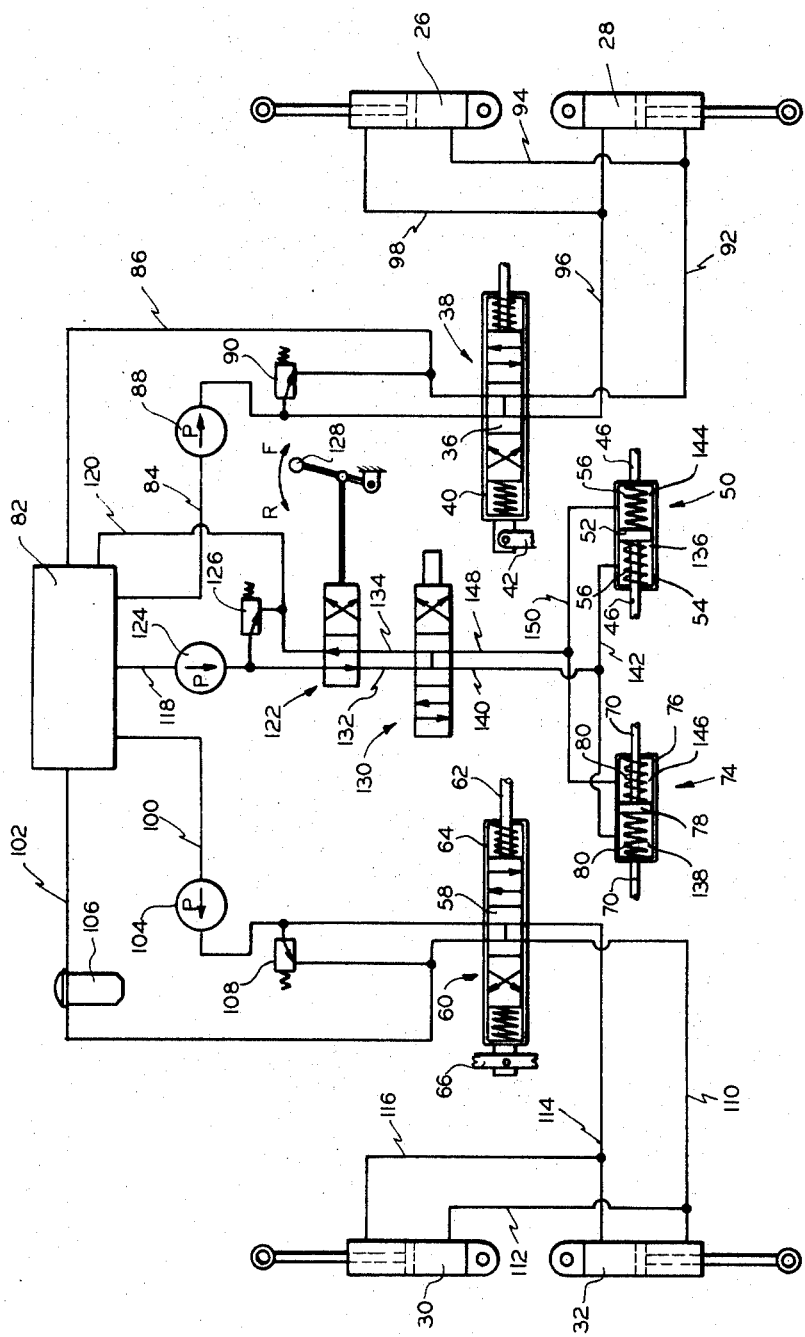

3,400,778
FOUR-WHEEL FLUID STEERING SYSTEM
Eugene F. Hand, Stevensville, Mich., assignor to Clark Equipment Company, a corporation of Michigan
Filed Sept. 25, 1967, Ser. No. 670,196
3 Claims. (Cl. 180—79.2)

ABSTRACT OF THE DISCLOSURE

A vehicle having two pairs of dirigible wheels which are controlled by a steering system. The steering system includes a first valve for controlling pivoting of one of the pairs of wheels and a second valve for controlling pivoting of the other of the pairs of wheels. Follow-up linkage is connected between each valve and the respective pair of wheels and includes fluid operated mechanism for changing the length of the linkage in order to actuate the associated valve so that both pairs of wheels pivot in the same direction. The connection of the mechanism to the source of pressurized fluid is reversible and responsive to the position of the direction selector for the vehicle.

Background of the invention

The field of art to which the invention pertains includes steering gear, and more specifically fluid operated steering gear for land vehicles.

A principal object of my invention is to provide a power steering system having an oblique mode of operation which is intuitive for either forward or reverse direction of vehicle travel.

Another object of my invention is to provide a simple and reliable power steering system that has a radiarc mode of operation and an oblique mode of operation.

Summary of the invention

In carrying out my invention in a preferred embodiment thereof, I provide a power steering system having a first valve for controlling pivotal movement of a first pair of dirigible wheels and a second valve for controlling pivotal movement of a second pair of dirigible wheels. Follow-up linkage is connected between each valve and the respective pair of wheels and includes fluid operated mechanism for changing the length of the linkage in order to actuate the associated valve so that both pairs of wheels pivot in the same direction. The connection of the mechanism to the source of pressurized fluid is reversible and responsive to the position of the direction selector for the vehicle with which the steering system is associated.

The above and other objects, features and advantages of my invention will be more readily understood by persons skilled in the art when the following detailed description is taken in conjunction with the accompanying drawing.

Brief description of the drawing

FIGURE 1 is a diagrammatic plan view of a vehicle showing to advantage my novel steering system and FIGURE 2 is a schematic drawing showing the hydraulic circuitry of my steering system.

Description of the preferred embodiment

Referring now to FIGS. 1 and 2, the reference numeral 10 denotes generally a vehicle having a front axle 12 at the outer ends of which a pair of dirigible wheels 14 are journaled for pivotal movement about substantially vertical steering axes and for rotation about a horizontal axis and a rear axle 16 at the outer ends of which a pair of dirigible wheels 18 are journaled for pivotal movement about subsantially vertical steering axes and for rotation about a horizontal axis. Wheels 14 are interconnected for conjoint pivotal movement by means of a tie rod 20, and similarly wheels 18 are interconnected by a tie rod 22.

Vehicle 10 is steered by means of a four-wheel steering system which includes a steering control wheel 24, a pair of double-acting piston and cylinder type fluid motors 26 and 28 connected between front axle 12 and dirigible wheels 14 and a pair of double-acting piston and cylinder type fluid motors 30 and 32 connected between rear axle 16 and dirigible wheel 18. Although a pair of fluid motors is shown in association with each axle and the dirigible wheels, the system functions in the same manner if only a single fluid motor is provided with each pair of dirigible wheels.

A pitman arm 34 is connected to steering control wheel 24 by means of a conventional worm and sector gear mechanism so that rotation of steering control wheel 24 causes pivotal movement of pitman arm 34. Connected to pitman arm 34 is the spool 36 of a four-way open-center valve 38 which controls the supply of a pressurized fluid to fluid motors 26 and 28 as will be explained in more detail shortly. The valve 38 includes a body 40 which is pivotally connected to a bar 42 that is pivotally connected at 44 to the vehicle frame. Pivotally connected to bar 42 on the opposite side of pivotal connection 44 from valve 38 is a rod 46 which is pivotally connected at the other end thereof to a bracket 48 which is connected to one of dirigible wheels 14, as shown. At this point it will be understood that rod 46 and bar 42 function as followup linkage for valve 38 so that movement of dirigible wheels 14 returns valve 38 to its neutral or closed position as is well known in the art. Rod 46 is divided into two portions which are connected by a spring centered piston and cylinder assembly 50 which functions to change the length of rod 46. Assembly 50 includes a piston 52 connected to one portion of rod 46 and a cylinder 54 which is connected to the other portion of rod 46. Piston 52 is slidably disposed in cylinder 54 and divides it into two chambers 136 and 144. Piston 52 is centered in cylinder 54 by means of a pair of opposed springs 56 which are disposed in the chambers.

The spool 58 of a four-way open-center valve 60 also is connected to pitman arm 34 by means of a rod 62. Valve 60 includes a body 64 which is pivotally connected to a bar 66 which is pivotally connected to the vehicle frame at 68. Also, bar 66 has a rod 70 pivotally connected thereto at one end thereof, the other end of rod 70 being pivotally connected to a bracket 72 attached to one of dirigible wheels 18. Bar 66 and rod 70 function as followup linkage for valve 60 so that pivotal movement of dirigible wheels 18 restores valve 60 to its neutral or closed position. Rod 70 is divided into two portions which are connected by means of a spring centered piston and cylinder assembly 74 which functions to change the length of rod 70. Assembly 74 includes a cylinder 76 connected to one portion of rod 70 and a piston 78 slidably disposed in cylinder 76 and connected to the other portion of rod 70. Piston 78 divides cylinder 76 into two chambers 138 and 146 and is biased to a centered position relative to cylinder 76 by means of a pair of springs 80 disposed in chambers 138 and 146.

The steering system also includes a fluid reservoir 82. Connected between reservoir 82 and body 40 of valve 38 are fluid supply and return conduits 84 and 86. Disposed in conduit 84 is a fluid pump 88 and connected between conduits 84 and 86 is a conventional pressure relief valve 90. Also connected to the body 40 of valve 38 is a conduit 92 which communicates with the rod end of motor 28. A branch conduit 94 connects conduit 92 with the head end of motor 26. Similarly, another conduit 96 is connected to body 40 of valve 38 and communicates with the head end of motor 28 and a branch conduit 98 connects conduit 96 with the rod end of motor 26.

Fluid supply and return conduits 100 and 102 are connected between reservoir 82 and body 64 of valve 60. Disposed in conduit 100 is a fluid pump 104 and disposed in return conduit 102 is a fluid filter 106. A fluid pressure relief valve 108 is connected between conduits 100 and 102. Further, a conduit 110 is connected to housing 64 of valve 60 and communicates with the rod end of motor 32 and a branch conduit 112 connects conduit 110 with the head end of motor 30. Similarly, another conduit 114 is connected to body 64 of valve 60 and communicates with the head end of motor 32, a branch conduit 116 being connected to conduit 114 and communicating with the rod end of motor 30.

Connected to reservoir 82 is a pair of conduits 118 and 120 which are connected to a two-position valve 122. Disposed in conduit 118 is a fluid pump 124 and connected between conduits 118 and 120 is a conventional pressure relief valve 126. It will be noted at this point that valve 122 is connected to a direction selector 128 which has a position for conditioning the drive train of the vehicle for forward drive and a position for conditioning the drive train of the vehicle for reverse drive. Thus, when selector 128 is in the position shown the vehicle is in condition for forward drive and valve 122 is in the position shown. Valve 122 is connected to a conventional four-way open-center valve 130 by means of a pair of conduits 132 and 134, as shown. At this point it will be seen that by shifting valve 122 between its two positions that the supply of pressurized fluid to valve 130 can be reversed. Valve 130 which conditions the steering system for left or right oblique steering is connected to chambers 136 and 138 of assemblies 50 and 74, respectively, by means of a conduit 140 and a branch conduit 142. Similarly, chambers 144 and 146 of assemblies 50 and 74, respectively, are connected to valve 130 by means of conduit 148 and branch conduit 150.

While the source of pressurized fluid for the various fluid motors and the piston and cylinder assemblies has been described as three separate pumps it will be understood that a single pump in conjunction with a flow divider could be used just as well.

In order to promote a better understanding of my invention I will now explain the operation of it. It will be assumed that vehicle 10 is traveling in a forward direction, toward the right as viewed in FIG. 1, and that the operator wishes to turn the vehicle to the right. In order to accomplish this the operator rotates steering control wheel 24 in a clockwise direction, as viewed from the operator's position, so that pitman arm 34 is pivoted in a clockwise direction, as viewed in FIG. 1, thereby actuating valve 38 so that pressurized fluid supplied via conduit 84 from pump 88 is directed to conduit 96 and from there to the rod end of motor 26 and the head end of motor 28 with the result that dirigible wheels 14 are pivoted in a clockwise direction, as viewed in FIG. 1. At the same time, clockwise movement of pitman arm 34 also actuates valve 60 so that pressurized fluid from pump 104 is supplied to conduits 114 and 116 and hence the rod end of motor 30 and the head end of motor 32 so that dirigible wheels 18 are pivoted in a counterclockwise direction, as viewed in FIG. 1. Should it be desired to turn vehicle 10 toward the left the operator need merely rotate steering control wheel 24 in a counterclockwise direction which causes pitman arm 34 to pivot in a counterclockwise direction with the result that valve 38 is actuated to connect conduits 92 and 94 with pump 88 and valve 60 is actuated to connect conduits 110 and 112 with pump 104. The fluid motors are then actuated to pivot dirigible wheels 14 in a counterclockwise direction and dirigible wheels 18 in a clockwise direction so that vehicle 10 will turn to the left. Occasionally it is desirable for the operator to be able to move vehicle 10 to one side or the other without changing the heading of the vehicle. In order to accomplish this, oblique steering is used. Again assuming that vehicle 10 is traveling in a forward direction, toward the right in FIG. 1, and that it is desired to move the vehicle to the right without changing its heading it is necessary only for the operator to actuate valve 130 so that pressurized fluid from pump 124 is directed to conduits 148 and 150, thus supplying pressurized fluid to chambers 144 and 146. By supplying pressurized fluid to chamber 144 rod 46 in effect is caused to lengthen so that valve 38 is actuated to connect conduit 84 with conduit 96, whereby pressurized fluid from pump 88 is supplied to the rod end of motor 26 and the head end of motor 28 to cause dirigible wheels 14 to pivot in a clockwise direction. Similarly, supplying pressurized fluid to chamber 146 in effect causes rod 70 to shorten so that valve 60 is actuated to connect conduit 100 with conduits 110 and 112 so that pressurized fluid from pump 104 is supplied to the head end of motor 30 and the rod end of motor 32 with the result that dirigible wheels 18 are pivoted in a clockwise direction, the same as dirigible wheels 14. It should be noted that during oblique steering that steering control wheel 24 is not used. Instead, the operator merely actuates valve 130 to select either right oblique movement or left oblique movement of vehicle 10.

In order to move vehicle 10 obliquely to the left while proceeding in a forward direction it is necessary to actuate valve 130 so that pressurized fluid from pump 124 is supplied to conduits 140 and 142 and hence chambers 136 and 138, thereby reversing the actuation of valves 38 and 60 so that pressurized fluid is supplied to the motors to pivot wheels 14 and 18 in a counterclockwise direction.

It will now be assumed that vehicle 10 is being driven in a reverse direction, toward the left in FIG. 1, and that it is desired to move the vehicle obliquely to the right side. Since the vehicle is conditioned for rearward movement selector 128 will be actuated so that valve 122 is shifted to connect conduit 118 with conduit 134. Therefore, valve 130 can be actuated to the same position as is necessary to provide right oblique steering when the vehicle is moving forwardly. That is, valve 130 is actuated to the position to connect conduit 132 with conduit 148 and at the same time connect conduit 134 with conduit 140. As a result pressurized fluid from pump 124 is supplied to conduit 140 and via conduit 142 to chambers 136 and 138 which causes a shortening of rod 46 and a lengthening of rod 70. Shortening of rod 46 actuates valve 38 so that pressurized fluid from pump 88 is supplied to conduits 92 and 94 so that fluid motors 26 and 28 are actuated to pivot in a counterclockwise direction. Similarly, lengthening of rod 70 actuates valve 60 so that pressurized fluid from pump 104 is supplied to conduits 114 and 116 to actuate motors 30 and 32 to pivot wheels 118 in a counterclockwise direction.

In order to move vehicle 10 obliquely to the left during reverse movement, valve 130 is actuated to connect conduit 132 with conduit 140 and conduit 134 with conduit 148, whereby rod 46 is lengthened and rod 70 is shortened so that valves 38 and 60 are actuated to supply pressurized fluid to the motors to cause wheels 14 and 18 to both pivot in a clockwise direction.

At this point it will be appreciated that because of the reversing of the connection between pump 124 and valve 140 due to the actuation of valve 122 which is responsive to the manipulation of direction selector 128 that valve 130 which conditions the vehicle for oblique motor steering is moved in the same direction for the desired oblique steering, that is to the left or right side, regardless of the direction of vehicle travel.

While I have described only a single embodiment of my invention in the foregoing description, it will be understood that this is for the purpose of illustration only and that my invention is susceptible to various modifications, changes and rearrangements of structure which still fall within the scope and spirit of my invention. Therefore, the limits of my invention should be determined from the following appended claims.

I claim:
1. For use with a vehicle having a frame, first dirigible wheel means, second dirigible wheel means, a source of pressurized fluid and a direction selector having a forward position and a reverse position, a power steering system comprising first means for pivoting the first wheel means in one direction or the opposite direction, second means for pivoting the second wheel means in one direction or the opposite direction, a first valve having first and second elements movable relative to each other between a neutral position and first and second open positions, the said first valve being connected between the source and the said first pivoting means so that when the said first valve is in its first open position pressurized fluid is supplied to the said first pivoting means to pivot the first wheel means in one direction and when the said first valve is in its second open position pressurized fluid is supplied to the said first pivoting means to pivot the first wheel means in the opposite direction, first linkage connected to one of the said elements of the said first valve and the first wheel means so that movement of the first wheel means causes the said first valve to be actuated toward its neutral position, a second valve having third and fourth elements movable relative to each other between a neutral position and third and fourth open positions, the said second valve being connected between the source and the said second pivoting means so that when the said second valve is in its third open position pressurized fluid is supplied to the said second pivoting means to pivot the second wheel means in one direction and when the said second valve is in its fourth open position pressurized fluid is supplied to the said second pivoting means to pivot the second wheel means in the opposite direction, second linkage connected to one of the said elements of the said second valve and the second wheel means so that movement of the second wheel means causes the said second valve to be actuated toward its neutral position, first mechanism connected to the said first linkage for changing the length of the said first linkage so that the said first valve is actuated to supply pressurized fluid to the said first pivoting means, second mechanism connected to the said second linkage for changing the length of the said second linkage so that the said second valve is actuated to supply pressurized fluid to the said second pivoting means, and means for coordinating actuation of the said mechanisms so that the first and second wheel means are pivoted in the same direction.

2. A power steering system as set forth in claim 1 wherein each mechanism is a spring centered piston and cylinder assembly having first and second fluid chambers, and the said coordinating means includes a third valve connected between the source and the said chambers, the said third valve being actuatable from a neutral position to a fifth position to supply pressurized fluid to the first chambers or a sixth position to supply pressurized fluid to the said second chambers.

3. A power steering system as set forth in claim 2 wherein the said third valve includes first and second fluid ports, and including a fourth valve connected between the source and the said first and second ports and actuatable between a seventh position in which the said first port is connected to the source and an eighth position in which the said second port is connected to the source, the said fourth valve also being connected to the direction selector so that when the selector is in the forward position the said fourth valve is in the said seventh position and when the selector is in the reverse position the said fourth valve is in the said eighth position.

References Cited
UNITED STATES PATENTS

| | | | |
|---|---|---|---|
| 3,092,201 | 6/1963 | Biek | 180—79.2 |
| 3,185,245 | 5/1965 | Hoyt | 280—91 |
| 3,202,238 | 8/1965 | Strader | 280—91 |
| 3,292,725 | 12/1966 | Hlinsky | 180—79.2 |

BENJAMIN HERSH, *Primary Examiner.*

L. D. MORRIS, JR., *Assistant Examiner.*